T. J. Lowry,
Brick Mold.
N° 80,358.   Patented July 28, 1868.

Witnesses:  
H. C. Aslukettle  
Wm. A. Morgan

Inventor:  
T. J. Lowry  
per Munn & Co. Atty

United States Patent Office.

THOMAS J. LOWRY, OF CONNEAUTVILLE, PENNSYLVANIA.

*Letters Patent No. 80,358, dated July 28, 1868.*

IMPROVED MOULD FOR BUILDING-BLOCKS.

*The Schedule referred to in these Letters Patent and making part of the same.*

TO ALL WHOM IT MAY CONCERN:

Be it known that I, THOMAS J. LOWRY, of Conneautville, in the county of Crawford, and State of Pennsylvania, have invented a new and improved Mould for Building-Blocks; and I do hereby declare that the following is a full, clear, and exact description thereof, which will enable those skilled in the art to make and use the same, reference being had to the accompanying drawings, forming part of this specification.

The nature of my invention relates to improvements in moulds for forming building-blocks, as will be more fully described on reference to the accompanying drawings, wherein—

Figure 1:
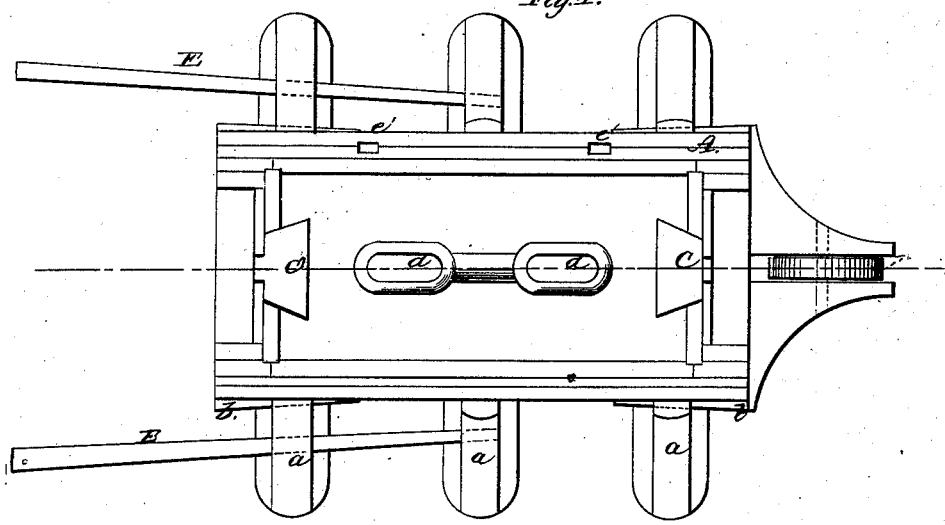
Figure 2:
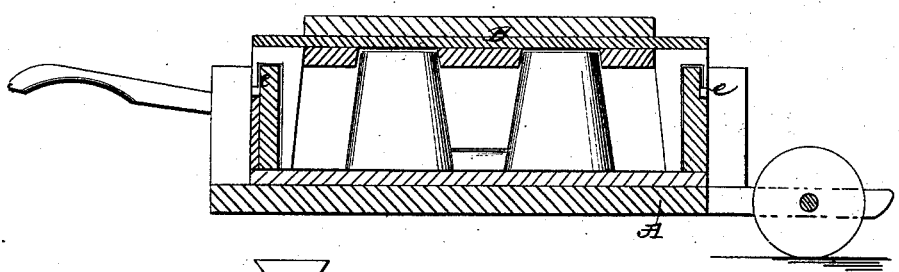
Figure 3:
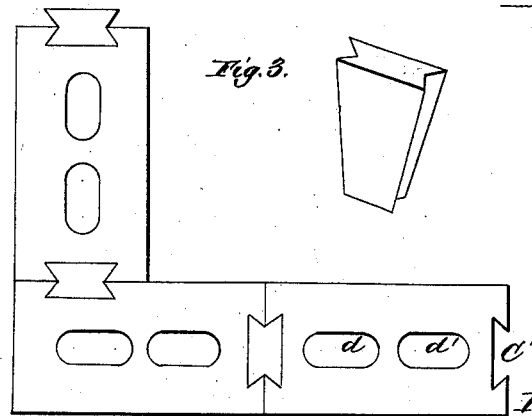

Figure 1 represents a plan view of a mould for forming the said matter into blocks, Figure 2 represents a longitudinal sectional elevation of the same, and Figure 3 represents a plan view of some of the blocks, and the manner of joining them together in a wall.

Similar letters of reference indicate corresponding parts.

The moulds are designed to form the blocks of any required size or form, with perpendicular cavities, cells, or perforations through them. They have also dove-tail grooves formed in their ends or sides, where they are jointed together in forming a wall. The grooves are designed to receive cement for securing the blocks firmly together in the wall.

A, in the drawings, represents a box-mould, the sides and ends of which are very firmly secured together by the stanchions $a$, and wedges $b\ b$, and which is provided with dove-tail cores $c\ c$ and tapered fixed cores $d\ d$, the latter being for forming the perforations $d'\ d'$ in the blocks, and the former for forming the dove-tail grooves $c'\ c'$ in the ends or sides of the blocks.

As shown in the drawings, they are arranged for forming the grooves in the ends of the blocks, but when it is designed to form the grooves in the sides, they are shifted to the sides of the mould-box, the hooked projections $e$ being inserted in the holes $e'$ in the side of the mould-box.

B represents a follower, which is placed on the mould after it has been filled, for pressing and solidifying the composition in the mould before it has become set by being placed under a press.

After it has become set, the wedges $b$ are loosened to admit the block to be easily discharged from the mould.

D represents a wheel, and

E E are handles, whereby the mould is easily moved about or turned over to discharge the blocks, by which the same may be accomplished by one person.

I claim as new, and desire to secure by Letters Patent—

The construction and arrangement of the improved mould for building-blocks, operated as herein described.

THOS. J. LOWRY.

Witnesses:
C. T. HOLMAN,
G. T. BOSTWICK.